3,281,406
PROCESS FOR THE PRODUCTION OF HIGHLY ACTIVE ISOMERS OF HYPERTENSIN II AND ITS ANALOGUES
Robert Schwyzer, Riehen, and Bernhard Riniker, Reinach, Basel-Land, Switzerland, assignors to Ciba Corporation, New York, N.Y., a corporation of Delaware
No Drawing. Filed June 5, 1963, Ser. No. 285,617
Claims priority, application Switzerland, June 20, 1962, 7,416/62
12 Claims. (Cl. 260—112.5)

The present invention relates to the manufacture of new, highly active isomers of hypertensin II and of its analogues having a hypertensive action, namely the corresponding octapeptides which contain a β-asparagyl radical, and of their salts. Natural hypertensin II and its analogues of the formula L-asparagyl-L-α-(amino-lower alkyl)-amino-acetyl-L-α-amino-lower alkyl-acetyl-L-tyrosyl-L-α-amino-lower alkyl-acetyl-L-histidyl-L-prolyl-L-phenylalanine which are described in U.S. Patent No. 2,978,444, patented April 4, 1961 to Robert Schwyzer et al., are octapeptides consisting entirely of α-amino acid structural units. It is highly surprising that the activity is not impaired, and in fact even enhanced when one α-aminoacid, namely the α-aspartic acid, is replaced by the isomeric β-aminoacid.

The new β-asparagyl-peptides, which may contain up to 20% of α-asparagyl-peptide, and their physiologically tolerable acid addition salts have a specific hypertensive action about twice as high as that of the corresponding α-asparagyl-peptides. A particularly high activity is found with β-asparagyl-L-arginyl-L-valyl-L-tyrosyl-L-valyl-L-histidyl-L-prolyl - L - phenylalanine ($\beta$ - Asp$^1$, Val$^5$-hypertensin II). The β-aspartic acid is present in the racemate form.

The new isomeric octapeptides are obtained when an α-octapeptide of the formula L-asparagyl-L-α-(amino-lower alkyl)-amino-acetyl-L-α-amino-lower alkyl-acetyl-tyrosyl-L-α-amino-lower alkyl-acetyl - L - histidyl-L-prolyl-L-phenylalanine or a compound that contains instead of the L-α-aspartic acid radical the radical of L-α-asparagine is heated at a maximum temperature of 100° C. in an aqueous solution at an approximately neutral pH, more especially from 5 to 7, preferably 6, and the resulting D:L-β-asparagyl - L - α-(amino-lower alkyl)-amino-acetyl - L - a-amino-lower alkyl-acetyl-L-tyrosyl-L-α-amino-lower alkyl-acetyl - L - histidyl-L-prolyl-L-phenylalanine is isolated in admixture with at most 20% of the α-isomer.

The octapeptides used as starting materials are known. They contain as α-(amino-lower alkyl)-amino-acetic acid, for example, lysine, ornithine, α:γ-diaminobutyric acid, citrullin or preferably arginine. Particularly suitable radicals of the α-amino-lower alkyl-acetic acid are valyl and iso-leucyl, also leucyl, norleucyl, norvalyl and alanyl.

Depending on the reaction conditions used the new compounds are obtained in the form of bases or of their acid addition salts. From the acid addition salts it is possible to prepare the bases in known manner. The latter, on reaction with acids suitable for furnishing therapeutically acceptable salts, yield salts, for example salts with inorganic acids such as hydrohalic, for example hydrochloric or hydrobromic acid, nitric, thiocyanic, sulfuric, phosphoric acid; or with organic acids such as acetic, propionic, glycollic, lactic, pyruvic, oxalic, malonic, succinic, maleic, fumaric, tartaric, citric, benzoic, cinnamic, salicylic, 2-phenoxybenzoic, 2-acetoxybenzoic, mandelic, methanesulfonic, ethansulfonic, hydroxyethanesulfonic, benzenesulfonic or toluenesulfonic acid.

The new octapeptides and their physiologically tolerable acid addition salts may be used as hypertensive agents in the form of pharmaceutical preparations which contain the peptides in admixture with an organic or inorganic pharmaceutical excipient suitable for enteral or parenteral administration. Suitable excipients are substances that do not react with the polypeptides, such, for example, as gelatine, lactose, glucose, sodium chloride, starches, magnesium stearate, talcum, vegetable oils, benzyl alcohols, gums, polyalkylene glycols, white petroleum jelly, cholesterol or other known medicinal excipients. The pharmaceutical preparations may be, for example, tablets, dragees, powders, ointments, creams, suppositories, or in liquid form solutions, suspensions or emulsions. They may be sterilized and/or may contain assistants such as preservatives, stabilizers, wetting agents or emulsifiers. They may also contain other therapeutically valuable substances.

The following examples illustrate the invention.

The paper-chromatographic examinations were performed with the following systems:

System 45=secondary butanol:3% aqueous ammonia (100:44)
System 54=secondary butanol:isopropanol:monochloracetic acid:water (70:10:3g.:40)
System 104=chloroform:methanol:17% aquous ammonia (20:20:9).

The following abbreviations have been used:

H-Val-OH=L-valine
H-Asp-OH=aspartic acid
H-Asp(NH$_2$)-OH =asparagine
H-Arg-OH=L-arginine
H-Pro-OH=L-proline
H-Tyr-OH=L-tyrosine
H-Phe-OH=L-phenylalanine
H-His-OH=L-histidine.

*Example 1*

6.0 grams of Asp(NH$_2$)-Arg-Val-Tyr-Val-His-Pro-Phe-OH (of 83% purity) are refluxed in 300 ml. of water for 24 hours at pH=5.5 and then concentrated under vacuum to 20 ml. and lyophilized. Yield: 5.6 grams of hydrolysis mixture which is distributed in the system 0.3-molar ammonium acetate:n-butanol:methanol (4:4:1) over 300 stages with a phase volume of 25 ml. each. The distribution elements 90–118 (maximum at N° 104); K=0.53) yield at total of 4.160 grams of mixture of about 10% of α-Asp$^1$, Val$^5$-hypertensin II and about 90% of β-Asp$^1$, Val$^5$-hypertensin II.

*Example 2*

To separate the mixture of α-octapeptide and β-octapeptide obtained in Example 1, 3.39 grams of the fraction 90–118 are dissolved with heating in 25 ml. of methanol:2 N-ammonia (1:1 by volume) and the solution is poured over a column of neutral alumina (diameter: 3 cm.; height:40 cm.) which has been equilibrated in the same solvent system. Elution is performed with 12 fractions of 100 ml. each of methanol+2 N-ammonia. To isolate the peptides the whole is concentrated under vacuum to about half its volume, 2 ml. of 2 N-acetic acid are added, the mixture is further concentrated to 4 ml., lyophilized and dried in a high vacuum at 45° C. Fractions 3 and 4 furnish a total of 380 mg. of chromatographically pure α-octapeptide which, however, still contains about 20% of inorganic impurities [Na$_2$SO$_4$, K$_2$SO$_4$ and (NH$_4$)$_2$SO$_4$ stemming from the alumina column]. The α-Asp$^1$, Val$^5$-hypertensin II is isolated by dissolving the specimen in a small amount of water, salting out with concentrated ammonium acetate solution, filtering and drying in a high vacuum at 50° C., to yield 240 mg. of an amorphous powder which decomposes at about 225° C.

$[\alpha]_{364}^{23}=-184.6\pm2°$; $[\alpha]_D^{23}=-59.4\pm1°$ (c.=0.93 in 0.5 N-sodium hydroxide solution)

$[\alpha]_{364}^{23} = -215.8 \pm 2°$; $[\alpha]_D^{23} = -65.4 \pm 1°$ (c.=0.97 in 0.5 N-hydrochloric acid).

Peptide content (measured by way of the ultraviolet absorption difference at 294 mμ between the acid and alkaline solutions and comparison with a tyrosine standard solution)=91.7±1%. The balance to 100% is accounted for by water and acetic acid.

Paper-chromatography: Rf (45)=0.21; Rf (54)=0.48.
Thin-layer chromatography on alumina; Rf (45)=0.39, Rf (104)=0.48.

Electrophoresis:
  Formic acid-acetic acid buffer, pH 2.1, 5 hours, 7.5 v./cm.: −17.3 cm.;
  Ammonium acetate buffer, pH 4.75, 16 hours, 5 v./cm.: −9.7 cm.;
  Tris buffer, pH 9.1, 15 hours, 5 v./cm.: +3.8 cm.

(Tris-buffer=mixture of tris-hydroxymethyl-aminomethane and hydrochloric acid).

Fractions 6 to 11 of the alumina column give a total of 3.13 grams of chromatographically pure β-octapeptide containing 5–10% of inorganic impurities which are removed by dissolving the whole with heating in 15 ml. of water, adding 30 ml. of hot methanol and cooling to 0° C. The octapeptide precipitated in this manner is filtered off, washed with a little of a 3:1-mixture of methanol and water and dried at 50° C. in a high vacuum, to yield 2.09 grams of pure β-Asp$^1$, Val$^5$-hypertensin II as an amorphous powder which decomposes at about 235° C.

$[\alpha]_{364}^{23} = -211.8 \pm 2°$; $[\alpha]_D^{23} = -65.9 \pm 1°$ (c.=0.96 in 0.5 N-sodium hydroxide solution)
$[\alpha]_{364}^{23} = -234.4 \pm 2°$; $[\alpha]_D^{23} = -70.7 \pm 1°$ (c.=0.94 in 0.5 N-hydrochloric acid).

Peptide content (measured by way of the ultraviolet absorption difference at 294 mμ between acid and alkaline solutions and comparison with a tyrosine standard solution)=91.5±1%. The balance to 100% is accounted for by water and acetic acid.

Paper-chromatography: Rf (45)=0.21; Rf (54)=0.47.
Thin-layer chromatogram on alumina: Rf (45)=0.25, Rf (104)=0.15.

Electrophoresis:
  Formic acid-acetic acid buffer, pH 2.1, 5 hours, 7.5 v./cm.: −15.7 cm.;
  Ammonium acetate buffer, pH 4.75, 16 hours, 5 v./cm.: −9.7 cm.;
  Tris buffer, pH 9.1, 15 hours, 5 v./cm.: +0.9 cm.

What is claimed is:

1. Process for the manufacture of highly active isomers of hypertensin II and of its analogues having a hypertensive action, wherein a member selected from the group consisting of the α-octapeptide of the formula L-α-asparagyl-L-α-(amino-lower alkyl)-amino-acetyl - L - α-amino-lower alkyl-acetyl - L - tyrosyl-L-α-amino-lower alkyl-acetyl-L-histidyl-L-prolyl-L-phenylalanine and the corresponding L-α-asparaginyl compound is heated in an aqueous solution at an approximately neutral pH and the resulting D:L-β-asparagyl-L-α-(amino-lower alkyl)-amino-acetyl-L-α-amino-lower alkyl-acetyl - L - tyrosyl-L - α - amino-lower alkyl-acetyl-L-histidyl-L-prolyl-L-phenylalanine is isolated in admixture with at most 20% of the α-isomer.

2. Process according to claim 1, wherein the reaction is performed at a pH from 5 to 7.

3. Process according to claim 1, wherein L-α-asparaginyl-L-arginyl - L - valyl - L - tyrosyl-L-valyl-L-histidyl-L-prolyl-L-phenylalanine is used as starting material.

4. Process according to claim 3, wherein a resulting mixture of D,L-β-asparagyl-L-arginyl-L-valyl-L-tyrosyl-L-valyl-L-histidyl-L-prolyl - L - phenylalanine and D,L-α-asparagyl-L-arginyl - L - valyl-L-tryosyl-L-valyl-L-histidyl-L-prolyl-L-phenylalanine is separated by chromatography over alumina.

5. Process according to claim 4, wherein methanol+2 N-ammonia (1:1) is used as eluant.

6. D,L-β-asparagyl-L-α-(amino-lower alkyl) - amino-acetyl-L-α-amino-lower alkyl-acetyl - L - tyrosyl-L-α-amino-lower alkyl-acetyl - L - histidyl-L-prolyl-L-phenylalanine.

7. A member selected from the group consisting of D,L-β-asparagyl - L - arginyl - L -valyl-L-tyrosyl-L-valyl-L-histidyl-L-prolyl-L-phenylalanine and a physiologically tolerable acid addition salt thereof.

8. Mixtures of at least 80% of D,L-β-asparagyl-L-arginyl-L-valyl - L - tyrosyl - L - valyl-L-histidyl-L-prolyl-L-phenylalanine and at most 20% of D,L-α-asparagyl-L-arginyl-L-valyl - L - tyrosyl - L - valyl-L-histidyl-L-prolyl-L-phenylalanine.

9. Physiologically tolerable acid addition salts of the mixture of compounds claimed in claim 8.

10. Pharmaceutical preparations containing a physiologically tolerable acid addition salt of a mixture consisting of 85–95% of D,L-β-asparagyl-L-α-(amino-lower alkyl)-amino-acetyl - L - α-amino-lower alkyl-acetyl-L-tyrosyl - L - α - amino-lower alkyl-acetyl-L-histidyl-L-prolyl-L-phenylalanine and 15–5% of the α-isomer thereof together with a pharmaceutical excipient.

11. Pharmaceutical preparations containing a physiologically tolerable acid addition salt of D,L-β-asparagyl-L-arginyl - L-valyl-L-tyrosyl-L-valyl-L-histidyl-L-prolyl-L-phenylalanine together with a pharmaceutical excipient.

12. Pharmaceutical preparations containing a physiologically tolerable acid addition salt of a mixture consisting of 85–95% of D,L-β-asparagyl-L-arginyl-L-valyl-L-tyrosyl - L - valyl - L - histidyl-L-prolyl-L-phenylalanine and 15–5% of D,L-α-asparagyl-L-arginyl-L-valyl-L-tyrosyl-L-valyl - L histidyl - L - prolyl-L-phenylalanine together with a pharmaceutical excipient.

No references cited.

LEWIS GOTTS, *Primary Examiner.*

ELBERT L. ROBERTS, *Examiner.*

PERRY A. STITH, *Assistant Examiner.*